US005758845A

United States Patent [19]

Sunne et al.

[11] Patent Number: 5,758,845

[45] Date of Patent: Jun. 2, 1998

[54] VEHICLE HAVING A CERAMIC RADOME WITH A COMPLIANT, DISENGAGEABLE ATTACHMENT

[75] Inventors: Wayne Sunne; Eric Ek, both of Tucson, Ariz.

[73] Assignee: Raytheon Company, Los Angeles, Calif.

[21] Appl. No.: 709,929

[22] Filed: Sep. 9, 1996

[51] Int. Cl.[6] ............................ B64C 1/12; B64C 30/00

[52] U.S. Cl. ........................ 244/131; 244/132; 244/133; 244/117 A; 89/1.817

[58] Field of Search ................................ 244/131, 132, 244/133, 120, 117 A, 117 R, 158 A; 89/1.817

[56] References Cited

U.S. PATENT DOCUMENTS

| | | | |
|---|---|---|---|
| 2,937,597 | 5/1960 | Winn et al. | 102/105 |
| 3,177,811 | 4/1965 | Baylor et al. | 244/158 R |
| 3,336,872 | 8/1967 | Langen et al. | 244/158 A |
| 3,970,006 | 7/1976 | Copeland et al. | 244/117 A |
| 4,031,806 | 6/1977 | Stark et al. | 244/158 A |
| 4,702,439 | 10/1987 | Kelley et al. | 244/158 A |
| 4,867,357 | 9/1989 | Inglis et al. | 244/121 |
| 5,372,333 | 12/1994 | Uwira et al. | 244/117 A |

*Primary Examiner*—Virna Lissi Mojica
*Attorney, Agent, or Firm*—David W. Collins; Leonard A. Alkov; Glenn H. Lenzen, Jr.

[57] ABSTRACT

A vehicle having a ceramic radome includes a vehicle body having an opening therein, a ceramic radome sized to cover the opening of the vehicle body, and an attachment structure joining the radome to the vehicle body to cover the opening. The attachment structure has a substantially cylindrically symmetric compliant metallic transition element disposed structurally between the radome and the body. The radome is joined to a first end of the transition element by a first brazed butt-joint. A primary seal is disposed between the transition element and the vehicle body. A spanner nut overlies the transition element and has a first engagement to the transition element. A threaded engagement between the spanner nut and the vehicle body allows the radome/transition element assembly to be attached and tightened to the vehicle body and to be later removed.

20 Claims, 2 Drawing Sheets

VEHICLE HAVING A CERAMIC RADOME WITH A COMPLIANT, DISENGAGEABLE ATTACHMENT

BACKGROUND OF THE INVENTION

This invention relates to a vehicle having a ceramic radome, and, more particularly, to the attachment of the ceramic radome to the vehicle.

Outwardly looking radar, infrared, and/or visible-light sensors built into vehicles such as aircraft or missiles are usually protected by a covering termed a radome. The radome serves as a window that transmits the radiation sensed by the sensor. It also acts as a structural element that protects the sensor and carries aerodynamic loadings. In many cases, the radome protects a forward-looking sensor, so that the radome must bear large aerostructural loadings.

Where the vehicle moves relatively slowly, as in the case of helicopters, subsonic aircraft, and ground vehicles, some radomes are made of nonmetallic organic materials which have good energy transmission and low signal distortion, and can support small-to-moderate structural loadings at low-to-intermediate temperatures. For those vehicles that fly much faster, such as hypersonic aircraft or missiles flying in the Mach 3–20 range, nonmetallic organic materials are inadequate for use in radomes because aerodynamic friction heats the radome above the maximum operating temperature of the inorganic material.

In such cases, the radome is made of a ceramic material that has good elevated temperature strength and good energy transmission characteristics. Existing ceramics have the shortcoming that they are relatively brittle and easily fractured. The likelihood of fracture is increased by small surface defects in the ceramic and externally imposed stresses and strains. The ceramic radome is hermetically attached to the body of the missile, which is typically made of a metal with high-temperature strength, such as a titanium alloy.

The ceramic has a relatively low coefficient of thermal expansion ("CTE"), and the metal missile body has a relatively high CTE. When the missile body and radome are heated, the resulting CTE-mismatch strain between the radome and the missile body can greatly increase the propensity of the radome to fracture in a brittle manner, leading to failure of the sensor and failure of the missile. Such heating can occur during the joining operation, when the missile is carried on board a launch aircraft, or during service.

There is a need for an approach to the utilization of ceramic radomes in vehicles, particularly high-speed missiles, wherein the tendency to brittle fracture and radome failure is reduced. The present invention fulfills this need, and further provides related advantages.

SUMMARY OF THE INVENTION

The present invention provides a vehicle, such as a missile, having a ceramic radome removably affixed to the vehicle body. The attachment structure reduces or avoids thermal straining and stressing in the radome due to thermal expansion coefficient differences. The attachment structure itself does not tend to cause premature failure in the ceramic material, as has been the case for some prior attachment approaches. The attachment may be made hermetic if desired, so that the delicate sensor inside the radome is protected against external environmental influences, as well as aerodynamic and aerothermal loadings. The attachment of the radome to the vehicle is selectively disengageable after engagement, so that the radome may be removed from the missile in the event that, after assembly, a flaw is discovered in the radome or the sensor system located behind the radome. The attachment is accomplished economically.

In accordance with the invention, a vehicle having a ceramic radome comprises a vehicle body having an opening therein, a ceramic radome sized to cover the opening of the vehicle body, and an attachment structure joining the radome to the vehicle body to cover the opening. The attachment structure comprises a compliant metallic transition element having a first end and an oppositely disposed second end, disposed structurally between the radome and the body, a permanent attachment between the radome and the first end of the transition element, and a locking element overlying the transition element. The locking element has a first engagement to the transition element. There is a second engagement between the locking element and the vehicle body, such that the second engagement is reversibly tightenable. The first engagement and the second engagement are co-operable to draw the second end of the transition element toward contact with the vehicle body upon tightening of the second engagement.

Desirably, a primary seal and secondary seals are provided to render the attachment hermetic. In a preferred embodiment, the vehicle body is a missile body, the opening is in the vehicle nose for a nose radome, and the opening is substantially circular. The radome is preferably made of sapphire.

In one embodiment, the attachment structure includes a first brazed butt-joint attachment between the radome and the first end of the transition element, a spanner nut overlying the transition element with a first engagement to the transition element, and a threaded engagement between the spanner nut and the vehicle body. The first engagement desirably includes a shoulder on the spanner nut, a recess on the transition element, and a snap ring lying partly within the recess. The snap ring has a snap ring shoulder thereon disposed to engage the shoulder on the spanner nut. The second engagement includes an external thread on the vehicle body, and a corresponding matched internal thread on the spanner nut.

The transition element, having a long compliant arm region that flexes responsively to differential thermal expansion strains between the missile body and radome, reduces or prevents thermal stresses in the radome arising from differential thermal strains. The attachment structure achieves a removable attachment without itself inducing damage into the radome or the missile body. The preferred actively brazed butt joint between the transition element and the ceramic radome does not introduce damage or failure initiation sites into the ceramic radome. It also does not reduce the side-looking angle of the sensor within the radome. The removable attachment between the transition element and the vehicle body is secure, does not introduce strains into the radome, and is hermetic when appropriate seals are used.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
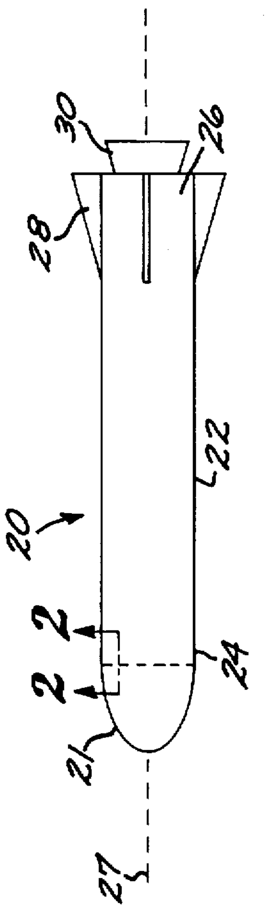
FIG. 1 is an elevational view of a missile with an attached radome.

FIG. 1 depicts a vehicle, here illustrated as a missile 20, having a radome 21 attached thereto. The radome 21 is forwardly facing as the missile flies and is therefore provided with a generally ogival shape that achieves a compromise between good aerodynamic properties and good radiation transmission properties. The missile 20 has a missile body 22 with a forward end 24, a rearward end 26, and a body axis 27. The missile body 22 is generally cylindrical, but it need not be perfectly so. Movable control fins 28 and an engine 30 (a rearward portion of which is visible in FIG. 1) are supported on the missile body 22. Inside the body of the missile are additional components that are not visible in FIG. 1, are well known in the art, and whose detailed structures are not pertinent to the present invention, including, for example, a seeker having a sensor, a guidance controller, motors for moving the control fins, a warhead, and a supply of fuel.

Figure 2:
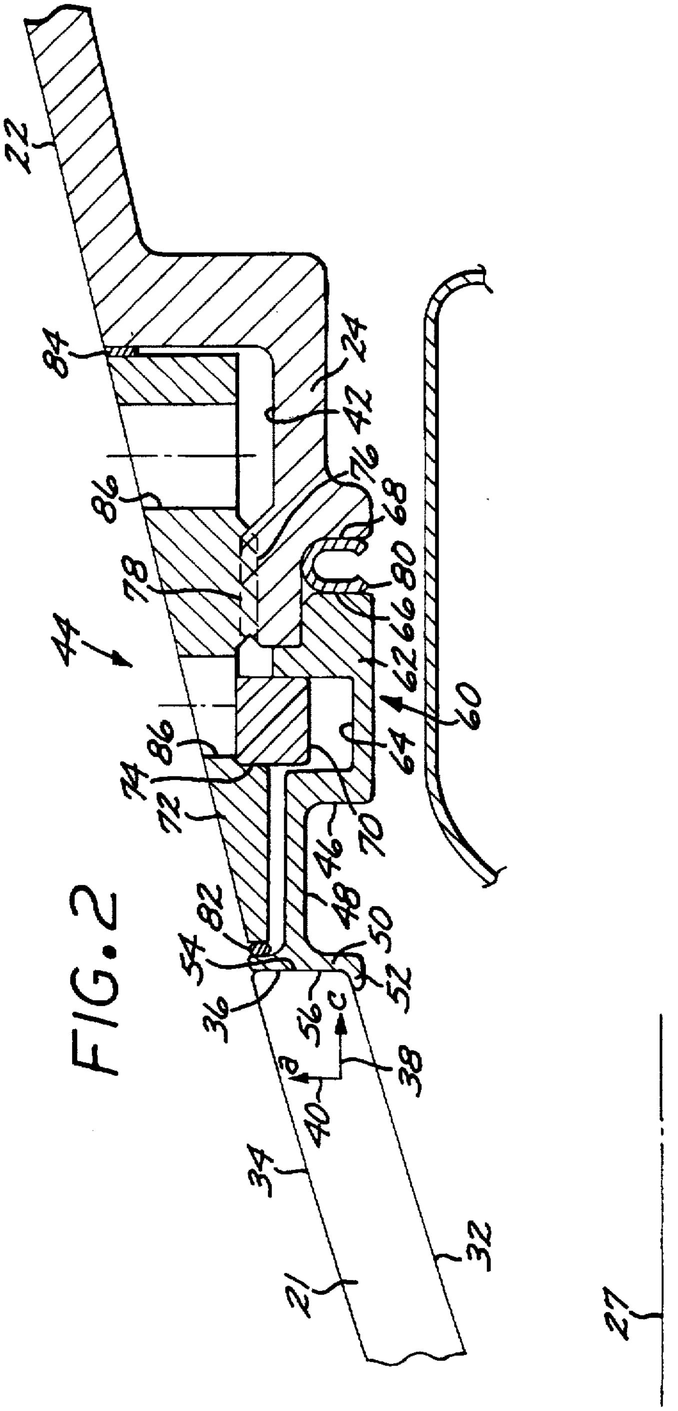
FIG. 2 is a schematic enlarged sectional view of the missile of FIG. 1, taken along line 2—2 in a radome attachment region.

FIG. 2 illustrates a region at the forward end 24 of the missile body 22, where the radome 21 attaches to the missile body 22. The radome 21 has an inside surface 32, an outside surface 34, and a lower margin surface 36 extending between the inner surface 32 and the outer surface 34. The lower margin surface 36 is generally perpendicular to the body axis 27. The radome 21 is made of a ceramic material. Preferably, the radome 21 is made of sapphire, a form of aluminum oxide. For structural reasons, the radome 21 is preferably fabricated with a crystallographic c-axis 38 of the sapphire generally (but not necessarily exactly) perpendicular to the margin surface 36. Thus, in the region of the radome 21 near to the margin surface 36, the crystallographic a-axis 40 of the sapphire is generally (but not necessarily exactly) perpendicular to the inner surface 32 and to the outer surface 34.

The most forward end of the missile body 22 defines a nose opening 42, which in this case is substantially circular because the missile body is generally cylindrical. An attachment structure 44 joins the radome 21 to the missile body 22 in order to cover and enclose the opening 42. The attachment structure includes a compliant metallic transition element 46. The transition element 46 has the form of a ring that extends around the entire opening 42, but is shown in section in FIG. 2.

In section, the transition element 46 has attachment structures at each end and a compliant region between the ends. An elongated compliant arm region 48 extends generally parallel to the body axis 27 of the missile 20. An upper crossbar region 50 extends perpendicular to the arm region 48 and thence generally perpendicular to the body axis 27. Optionally, a centering lip 52 extends from one end of the crossbar region 50, here the end adjacent to the inside surface 32 of the radome 21, upwardly toward the radome 21 and adjacent to the inside surface 32 of the radome 21. When the radome 21 is assembled to the body 22 and the transition element 46, the centering lip 52, when present, positions the radome exactly in a symmetrical position. The arm region 48 and the crossbar region 50 preferably extend completely around the circumference of the ring of the transition element 46, but the centering lip 52 may be either continuous or discontinuous in the form of short tabs. Alternatively, the centering function can be provided by tooling used in the assembly of the missile body, transition element, and radome, and the centering lip 52 is omitted.

The radome 21 is joined to the transition element 46 at a first attachment. The first attachment is preferably a brazed first butt joint 54 between an upper surface 56 of the crossbar region 50 of the transition element 46, and the lower margin surface 36 of the ceramic radome 21. The brazed butt joint 54 is preferably formed using an active brazing alloy which chemically reacts with the material of the radome 21 during the brazing operation.

In forming this butt joint 54, care is taken that the brazing alloy contacts only the lower margin surface 36 of the radome 21, and not its inside surface 32 or its outside surface 34. There is no brazed bond formed between the centering lip 52, where present, and the radome 21. The molten form of the active brazing alloy used to form the butt joint 54 can damage the inside surface 32 and the outside surface 34 of the radome, which lie perpendicular to the crystallographic a-axis of the sapphire material. The lower margin surface 36, which lies perpendicular to the crystallographic c-axis of the sapphire material, is much more resistant to damage by the active brazing alloy. The use of the butt joint to the margin surface of the sapphire radome thus minimizes damage to the sapphire material induced by the attachment approach.

The use of a butt joint to join the radome to the transition element is to be contrasted with the more common approach for forming joints of two structures, a lap or shear joint. In this case, the lap joint would be undesirable for two reasons. The first, as discussed in the preceding paragraph, is that the lap joint would necessarily cause contact of the brazing alloy to the inside and/or outside surfaces of the radome, which are more sensitive to damage by the molten brazing alloy. The second is that the lap or shear joint would extend a distance upwardly along the inside or outside surface of the radome, reducing the side-viewing angle for the sensor that is located within the radome. That is, the further the opaque lap joint would extend along the surface of the radome, the less viewing angle would be available for the sensor. In some applications, this reduction of the side-viewing angle would be critical.

At the oppositely disposed end of the arm region 48 from the first attachment, a second attachment 60 permits the semi-permanent attachment of the radome and transition element to the missile body. The second attachment 60 includes a second attachment region 62 that extends downwardly from the arm region 48 and has an external circumferential recess 64 therein. (The preferred embodiment of the invention is based upon a substantially cylindrical structure. In such a geometry, an "external" feature is one that faces radially outwardly, and an "internal" feature is one that faces radially inwardly.) A lower end 66 of the second attachment 60 faces but is spaced apart from an internal shoulder 68 of the missile body 22.

A circumferential snap ring 70 is received into the external recess 64. The snap ring 70 extends around most of the circumference of the transition element 46, but has a gap therein (not visible) to permit it to be expanded slightly so as to slip over the second attachment 60 and into the recess 64. The snap ring 70 is sized so as to reside in the external-most portion of the recess 64, except when it is circumferentially compressed.

A locking element, preferably in the form of a spanner nut 72, overlies the transition element 46. The spanner nut 72 has an inwardly facing shoulder 74 that engages the snap ring 66 residing in the recess 64, thereby engaging the transition element 46 and thence the transition element/radome assembly.

The forward end 24 of the missile body 22 has a set of externally facing threads 76 thereon. The spanner nut 72 has a corresponding matched set of internally facing threads 78 thereon. When the vehicle is assembled, the threads 78 are engaged to the threads 76 so that rotation of the spanner nut 72 draws the transition element 46 and thence the radome 21 toward the missile body 22.

The attachment may use other operable types of disengageable fasteners, such as, for example, overcenter clamps. The threaded spanner nut approach is preferred because it is not complex, is relatively inexpensive, and produces a smooth external surface which does not adversely affect the aerodynamics of the missile.

Seals are preferably provided as part of the attachment structure 44 so that the interior of the missile is hermetically sealed to exclude contaminants during storage and hot gas during service. A circumferential primary seal 80 is positioned between the lower end 66 of the transition element 46 and the internal shoulder 68 of the missile body 22. The raised portion of the shoulder acts to hold the primary seal 80 in place and also as a heat shield. The primary seal 80 may be of any type, but is preferably a "C" ring seal as illustrated. The primary seal 80 is made of a material that remains operable at the maximum temperature expected during service, such as, for example, silver-coated stainless steel.

Optionally, secondary seals such as a first circumferential external seal 82 and a second circumferential external seal 84 may be provided to seal the interior of the spanner nut from the exterior environment. In a prototype structure illustrated in FIG. 2, openings 86 were provided completely through the external surface of the spanner nut so that the internal operation of the structure could be observed. Consequently, the seals 82 and 84 would have no function in preventing environmental contact to the interior of the spanner nut. In one embodiment of a production structure, the openings 86 would not be through-openings and instead would extend only a portion of the distance into the spanner nut 72 to provide a wrench engagement, and the seals 82 and 84 would be present and functional. In another embodiment of a production structure, the openings 86 would be through-openings as shown and would be plugged with the same sealing material as the seals 82 and 84. The seals 82 and 84 are preferably made of a material such as RTV silicone. The RTV silicone provides sealing during storage, but melts and/or burns away during high-speed flight. Accordingly, the seals 82 and 84 are present primarily to protect against internal corrosion damage during storage, not against hot-gas damage during service. When the seal 82 is installed, care is taken that the sealing material does not contact the arm region 48 to interfere with its functioning.

The missile body 22 is preferably made of a metal such as a titanium alloy. The titanium alloy of the missile body 22 and the sapphire of the radome 21 have different coefficients of thermal expansion. When the missile 20 is heated and cooled during fabrication or service, the difference in thermal expansion coefficients causes the total expansion of the radome 21 and the missile body 22 to be different. This difference would ordinarily produce thermally induced stresses in the radome and the missile body. The thermally induced stresses have small effects on the missile body structure, but they can produce significant damage and reduction in failure stress in the ceramic material of the radome 21. The present approach of the transition element avoids or minimizes such thermally induced stresses.

The transition element 46 is made of a metal or metallic alloy. The arm region 48 is made relatively thin, so that it can bend and flex to accommodate differences in the coefficients of thermal expansion of the missile body 22 and the radome 21. Stated alternatively, the thermally induced stresses are introduced into the free portion of the arm region 48 of the transition element 46 and not into the radome 21.

Figure 3:
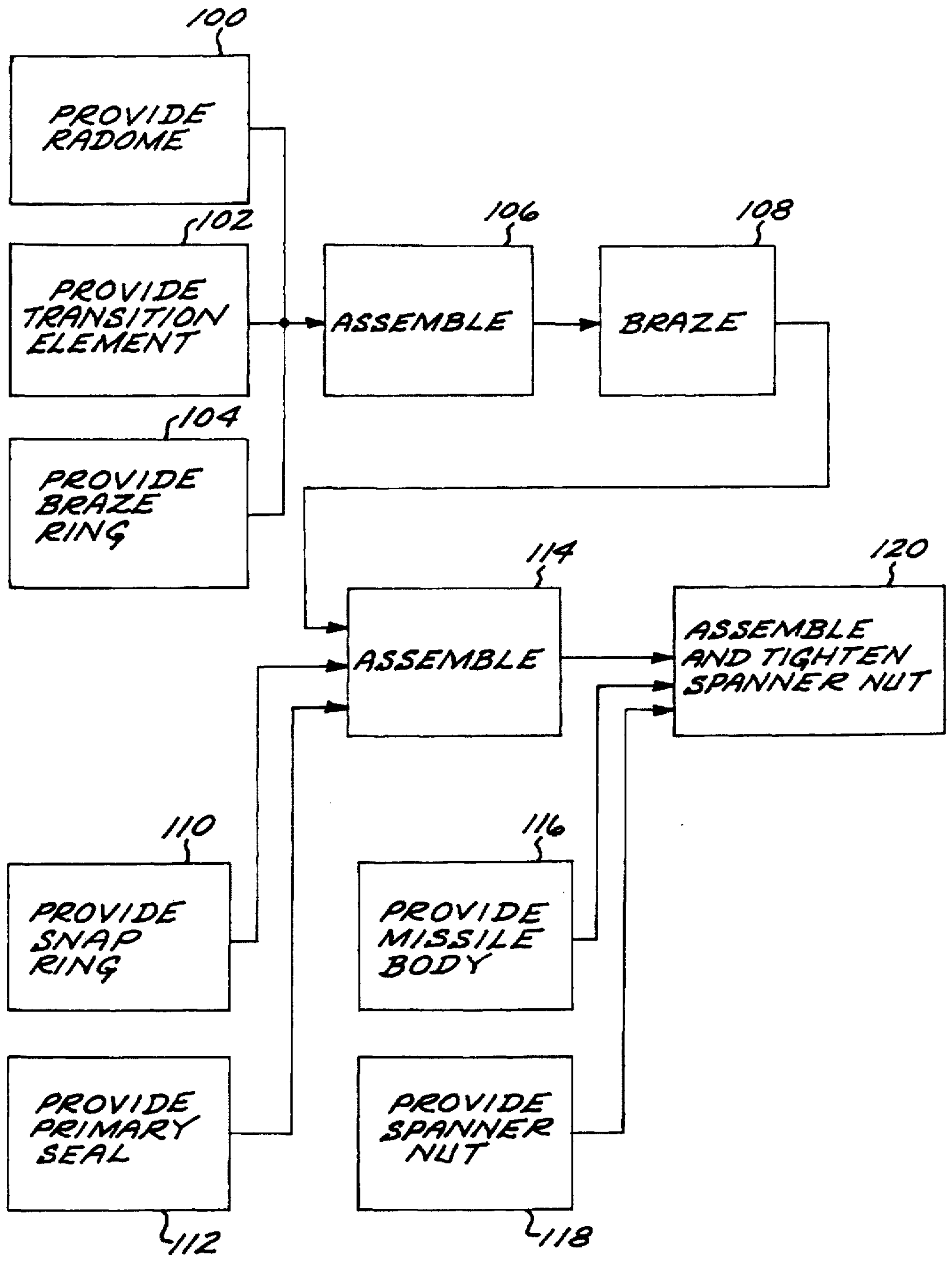
FIG. 3 is a block flow diagram for a method of preparing the missile of FIGS. 1 and 2.

FIG. 3 depicts an approach for fabricating the missile 20 having the radome 21 joined to the missile body 22. The ceramic radome 21, preferably made of sapphire, is provided, numeral 100. The sapphire radome is typically in the form of an oriented polycrystal with the c-axis 38 of the sapphire oriented substantially perpendicular to the lower margin surface 36.

The transition element 46 is provided, numeral 100. The transition element 46 is preferably a niobium-based alloy having a composition, in weight percent, of 1 percent zirconium, balance niobium. Other metallic materials may be used for the transition element, such as, for example, tantalum, tantalum-tungsten, or kovar. The niobium-based alloy is preferred because it is readily available, is easily machined, and has a coefficient of thermal expansion relatively close to that of the preferred radome material, sapphire.

A braze ring is provided, numeral 104. The braze ring is a washerlike ring of braze material that is sized to fit between the lower margin surface 36 and the upper surface 56 of the upper crossbar region 50. Care is taken such that the volume of the braze ring, which is readily determined by its thickness, is not so large that, upon melting, the braze metal is extruded and runs along the inner surface 32 and the outer surface 34 of the radome 21. In a preferred case, where the diameter of the first braze ring is about 2.9 inches, its thickness is about 0.002 inches and its width is about 65 percent of that of the lower margin surface 36.

The braze alloy used to make the braze ring is an active braze alloy. An active braze alloy is a braze alloy containing a reactive element, such as titanium or zirconium, which chemically reacts with the articles being brazed and also wets the articles being brazed. (By contrast, a non-active braze alloy wets the articles being brazed, but does not chemically react with them to form a reaction product.) The active braze alloy has the additional characteristic that it flows only sluggishly at the braze temperature, so that it has little tendency to run and flow from its originally sited position. That is, the active braze alloy does not tend to flow into areas where it is not initially sited and is not desired, such as the surfaces 32 and 34. This result is an important advantage for the present technology.

The preferred active braze alloy is Incusil aba, a commercially available alloy having a composition, in weight percent, of about 27.25 percent copper, 12.5 percent indium, 1.25 percent titanium, balance silver and a brazing temperature of about 1300° F.

The radome 21 and the transition element 46 are assembled with the braze ring therebetween, numeral 106, and held together with tooling under a small compressive load.

The brazed butt joint 54 is accomplished with a brazing cycle, numeral 108, recommended for the braze material. For the preferred Incusil aba active braze material, the brazing is accomplished by heating the assembly from step 106 to a brazing temperature sufficient to melt the braze alloy and cause it to flow freely, about 1300° F. The brazing is accomplished in a vacuum of about $10^{-6}$ atmosphere or less and with a temperature cycle involving a ramping up from room temperature to the brazing temperature of about 1300° F. for the preferred Incusil aba brazing material, a hold at the brazing temperature for 15 minutes, and a ramping down to ambient temperature, the total brazing cycle time being about 6 hours. Upon heating, the brazing alloy melts and flows into the region 54. The temperature is thereafter reduced to below the melting temperature of the braze alloy, so that the flowed braze alloy solidifies and forms the butt joint 54. The result is a subassembly of the radome 21 with the transition element 46 bonded thereto.

The snap ring 70 is provided, numeral 110, and the primary seal 80 is provided, numeral 112. These are assembled to the transition element 46, numeral 114.

The missile body 22 is provided, numeral 116. The portion of the missile body 22 that forms the opening 42 is preferably a titanium alloy such as Ti-6Al-4V, having a composition, in weight percent, of about 6 percent aluminum, 4 percent vanadium, balance titanium. The spanner nut 72, preferably also made of Ti-6Al-4V, is provided, numeral 118.

The radome/transition element subassembly and missile body 22 are assembled together with the spanner nut in place, and the spanner nut is tightened, numeral 120. Tightening of the spanner nut 72 draws the transition element 46, and thence the radome 21, rearwardly toward the missile body 22 by means of the engagement of the spanner nut and the transition element through the snap ring 70. The primary seal 80 is simultaneously compressed in place, as illustrated in FIG. 2, to provide the primary hermetic sealing between missile body and the radome/transition element subassembly. The secondary seals 82 and 84 are installed at this time, if used.

At a later time, the spanner nut may be loosened and disengaged to permit disassembly of the radome/transition element subassembly from the missile body. Such disassembly might be required, for example, if a component of the sensor system contained within the radome should fail during storage and need replacement. Disassembly destroys the secondary seals 82 and 84, if used. The radome/transition element may then be reinstalled in the manner described, with new seals 82 and 84, if used, and optionally with a new primary seal.

A prototype proof-of-concept missile with the attachment structure of the invention has been constructed and flown on an aircraft in captive flight. The structure functioned as described. The seeker within the radome 21 was successfully operated. Assembly and disassembly as described were demonstrated.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle having a ceramic radome, comprising:
   - a vehicle body having an opening therein;
   - a ceramic radome sized to cover the opening of the vehicle body; and
   - an attachment structure joining the radome to the vehicle body to cover the opening, the attachment structure comprising
     - a compliant metallic transition element disposed structurally between the radome and the body, the transition element having a first end and an oppositely disposed second end,
     - a permanent attachment between the radome and the first end of the transition element,
     - a locking element overlying the transition element, the locking element having a first engagement to the transition element, and
     - a second engagement between the locking element and the vehicle body, the second engagement being reversibly tightenable, and wherein the first engagement and the second engagement are co-operable to draw the second end of the transition element toward contact with the vehicle body upon tightening of the second engagement.

2. The vehicle of claim 1, further including
   - a primary seal disposed between the transition element and the vehicle body.
3. The vehicle of claim 1, further including
   - a first external seal disposed between the radome and the locking element.
4. The vehicle of claim 1, further including
   - a second external seal disposed between the locking element and the vehicle body.
5. The vehicle of claim 1, wherein the first engagement comprises
   - a shoulder on the locking element, and
   - means for engaging the locking element to the transition element.
6. The vehicle of claim 5, wherein the means for engaging comprises
   - a recess on the transition element, and
   - a snap ring lying partly within the recess, the snap ring have a snap ring shoulder thereon disposed to engage the shoulder on the locking element.
7. The vehicle of claim 1, wherein the second engagement comprises
   - an external thread on the vehicle body, and
   - a corresponding matched internal thread on the locking element.
8. The vehicle of claim 1, wherein the permanent attachment between the radome and the first end of the transition element comprises
   - a brazed joint between the radome and the first end of the transition element.
9. The vehicle of claim 8, wherein the brazed joint is a brazed butt joint.
10. The vehicle of claim 1, wherein the radome is made of sapphire.
11. The vehicle of claim 1, wherein the vehicle body is a missile body, and the opening is a nose opening in the missile body.
12. A vehicle having a ceramic radome, comprising:
    - a vehicle body having an opening therein;
    - a ceramic radome sized to cover the opening of the vehicle body; and
    - an attachment structure joining the radome to the vehicle body to cover the opening, the attachment structure comprising
      - a substantially cylindrically symmetric compliant metallic transition element disposed structurally between the radome and the body, the transition element having a first end, an oppositely disposed second end, and an arm region therebetween,
      - a first brazed butt-joint attachment between the radome and the first end of the transition element, a primary seal disposed between the transition element and the vehicle body, a spanner nut overlying the transition element, the spanner nut having a first engagement to the transition element, and a threaded engagement between the spanner nut and the vehicle body.

13. The vehicle of claim 12, wherein the threaded engagement comprises an external thread on the vehicle body, and a matched internal thread on the spanner nut.

14. The vehicle of claim 12, wherein the vehicle body is a missile body, and the opening is a nose opening in the missile body.

15. The vehicle of claim 12, wherein the first engagement comprises a shoulder on the spanner nut, and means for engaging the spanner nut to the transition element.

16. The vehicle of claim 15, wherein the means for engaging comprises a recess on the transition element, and a snap ring lying partly within the recess, the snap ring have a snap ring shoulder thereon disposed to engage the shoulder on the spanner nut.

17. A vehicle having a ceramic radome, comprising:

a missile body having a nose opening therein;

a sapphire radome sized to cover the opening of the missile body; and an attachment structure joining the radome to the missile body to cover the opening, the attachment structure comprising a substantially cylindrically symmetric compliant metallic transition element disposed structurally between the radome and the body, the transition element having a first end, an oppositely disposed second end, and an arm region therebetween, the transition element having an external recess therein;

a first brazed butt-joint attachment between the radome and the first end of the transition element, a primary seal disposed between the second end of the transition element and the missile body, a spanner nut overlying the transition element, the spanner nut having an internal shoulder therein, a snap ring lying partly within the external recess of the transition element, the snap ring having a snap ring external shoulder thereon disposed to engage the internal shoulder on the spanner nut, and a threaded engagement between the spanner nut and the missile body, the threaded engagement comprising an external thread on the missile body, and a matched internal thread on the spanner nut.

18. The vehicle of claim 17, further including a first external seal disposed between the radome and the locking element.

19. The vehicle of claim 17, further including a second external seal disposed between the locking element and the missile body.

20. A method for installing and removing a radome, comprising the steps of providing a vehicle body having an opening therein;

providing a ceramic radome sized to cover the opening of the vehicle body;

providing an attachment structure joining the radome to the vehicle body to cover the opening, the attachment structure comprising a compliant metallic transition element disposed structurally between the radome and the body, the transition element having a first end and an oppositely disposed second end, a permanent attachment between the radome and the first end of the transition element, a locking element overlying the transition element, the locking element having a first engagement to the transition element, and a second engagement between the locking element and the vehicle body, the second engagement being reversibly tightenable, and wherein the first engagement and the second engagement are co-operable to draw the second end of the transition element toward contact with the vehicle body upon tightening of the second engagement;

attaching the ceramic radome to the vehicle body using the attachment structure; and, at a later time, disengaging the ceramic radome from the vehicle body using the attachment structure.

* * * * *